United States Patent [19]
Trytko et al.

[11] Patent Number: 4,528,598
[45] Date of Patent: Jul. 9, 1985

[54] CHROMINANCE INVERTING ALL-PASS FILTER

[75] Inventors: David E. Trytko, Foster City; Steven D. Wagner, San Jose, both of Calif.

[73] Assignee: Ampex Corporation, Redwood City, Calif.

[21] Appl. No.: 483,328

[22] Filed: Apr. 8, 1983

[51] Int. Cl.$^3$ .................. H04N 5/94; H04N 9/491
[52] U.S. Cl. .................. 358/314; 358/21 R; 358/39; 358/40
[58] Field of Search .................. 358/310, 314–329, 358/21 R, 35, 39, 40

[56] References Cited

U.S. PATENT DOCUMENTS

| | | | |
|---|---|---|---|
| 4,122,489 | 10/1978 | Bolger et al. | 358/21 |
| 4,272,785 | 6/1981 | Fuhrer | 358/314 X |
| 4,464,686 | 8/1984 | Reitmeier | 358/314 |

Primary Examiner—Robert L. Richardson
Attorney, Agent, or Firm—George B. Almeida; Joel D. Talcott

[57] ABSTRACT

An all-pass filter provides inversion of a chrominance component in a composite signal without separating the chrominance component from the composite signal, to provide for example, synthesizing composite video from a previous line of video. The filter includes an input for receiving the composite signal along a subsequent signal path, and the application of selected, preferably symmetrical weighting factors to selected locations along the signal path. The path includes selected delay means coupled to define a filter output via summing means. The latter provides the composite signal with inverted chrominance without an objectionable change in the relative phase and amplitude of the luminance components relative to the inverted chrominance.

25 Claims, 5 Drawing Figures

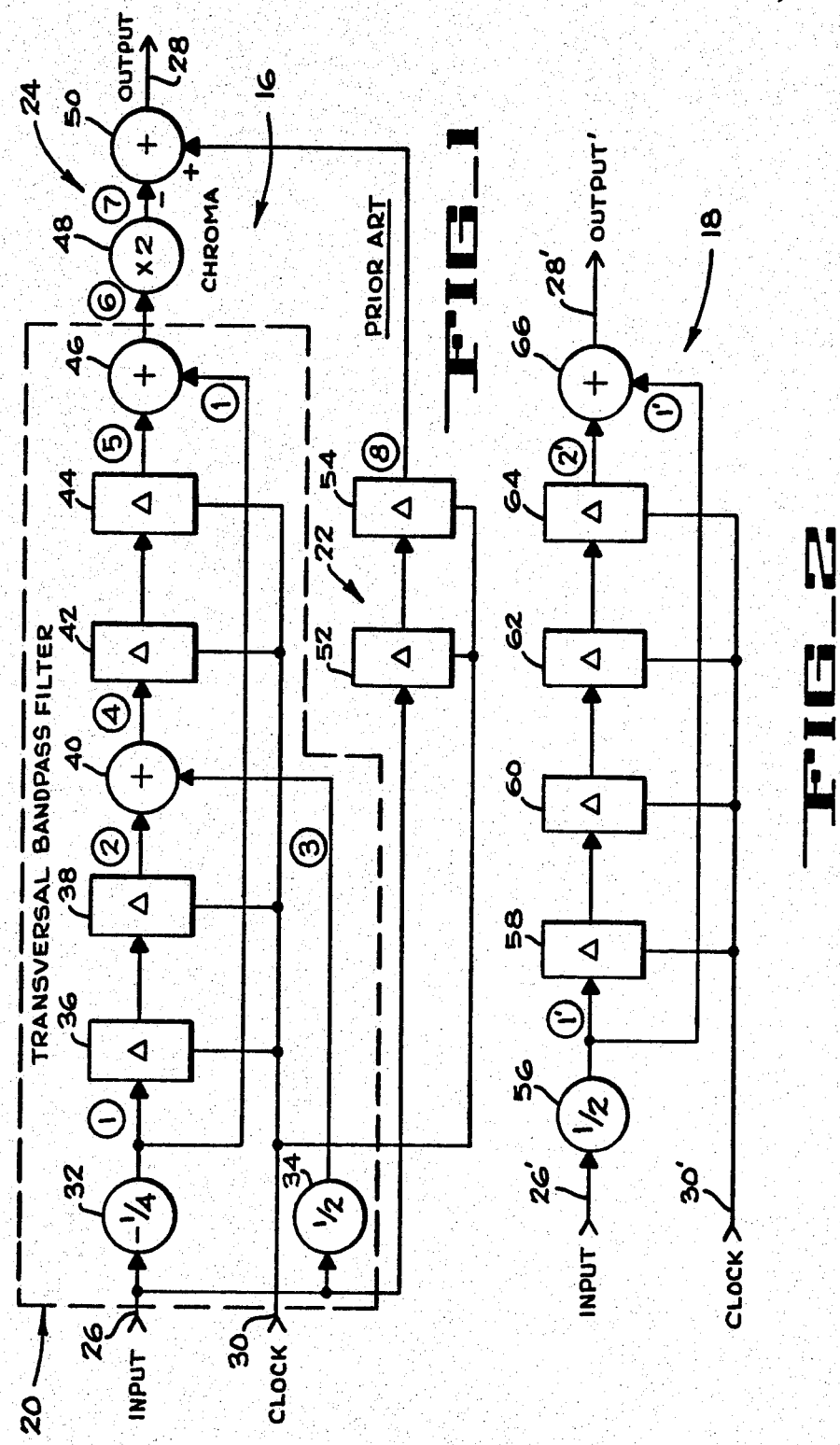

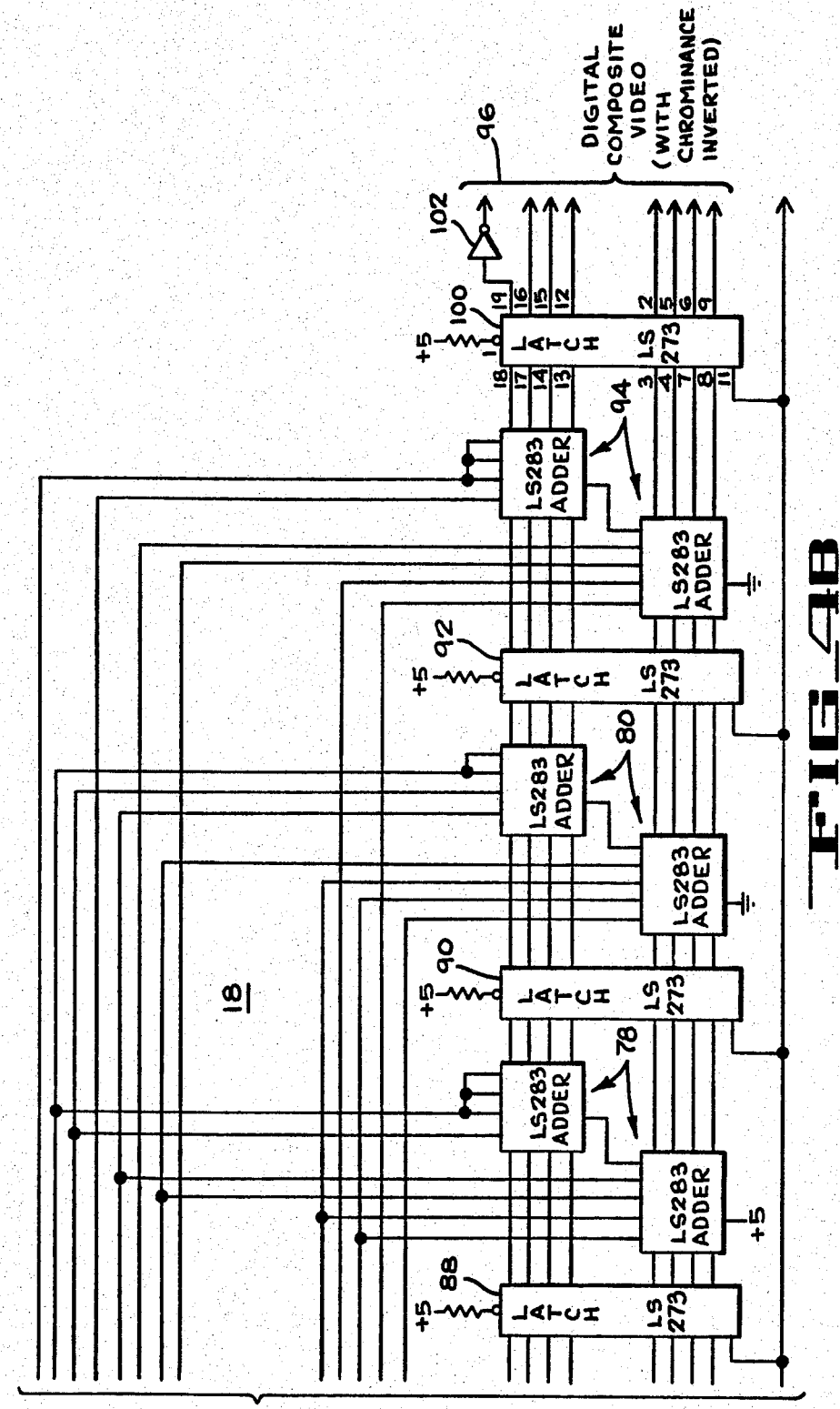
FIG_4B

CHROMINANCE INVERTING ALL-PASS FILTER

The invention relates to filters for processing composite signals, and particularly to a filter for processing of composite color video signals without separating the luminance and chrominance components forming the composite signal.

In the processing of composite signals such as, for example, color television signals, it is commonly known to separate various signal components, such as luminance and chrominance, into separate signal paths to allow individual processing, with subsequent re-combination of the processed components into a composite signal for further use. More particularly, in the color television field, the technique of signal separation, processing and re-combination is used when performing chrominance inversion, for example, in the process commonly known as dropout compensation, used during the magnetic reproduction of video signals from magnetic tape. The corresponding dropout compensators provide compensation by replacing an incorrect or missing portion of the color television signal, commonly called a dropout, caused by an improper recording or reproduction process or by a defect in the recording medium. Thus the disturbing effects of a dropout in a television picture as seen by a viewer, are removed.

Typical of known devices for separating a composite signal into component signals of different frequencies, are comb filters and bandpass filters. The former combine horizontal samples from two or more scan lines, while the latter employ samples from within the same line. In general, bandpass filters are designed to pass signals of selected bands of frequencies and to reject signals outside the selected bands. It follows that such bandpass filters are useful in the dropout compensators of previous mention, to provide separation of luminance and chrominance components to allow the component signal processing required when performing dropout compensation.

By way of example, a dropout compensator and bandpass filter combination is described in U.S. Pat. No. 4,251,831 to B. Y. Kamath, assigned to the same assignee as this application, wherein a transversal bandpass filter, and dropout compensator (DOC) employing the filter, are digital circuits operating on a digitized composite color video signal. As described in the patent, the filter is a type of digital bandpass filter which selects one or more signal components of a composite signal, and particularly of a composite color video signal. The digital signal to be processed is obtained in generally known fashion; for example, by sampling the analog composite video signal utilizing a sampling clock signal which is frequency and phased locked to the selected frequency component or components to be filtered, to provide digital representations of the samples. The filter employs a combination of digital storage devices, such as registers or latches serving as signal delay devices, and arithmetic circuitry arranged and operated to provide at the filter's output, for each digitized sample received at the filter's input, a digital average representation of the values of a selected number of received samples. The number of samples averaged is selected to define a time interval which provides, in this example, a zero average value of the averaged digital sample representations corresponding to the signal component to be eliminated from the composite signal by the filter. Control of the digital storage and arithmetic means is provided by a clock signal that has a frequency which is synchronized with and equal to the frequency at which the samples are received by the filter. In situations where the composite signal is transmitted to the filter at an unpredictable and randomly varying rate, the frequency of the filter control clock signal varies synchronously with the varying of receipt of the digitized samples. In situations where the digitized samples are received at a stable rate, a stable frequency clock signal is provided to control the filter.

As typified by the filter of the above-mentioned patent, and as generally the case in bandpass filters such as those employed in dropout compensators for processing color television signals, processing of specific frequency components from a digitized composite signal is performed by first actually separating the chrominance component from the composite color video signal. Thus, it follows that a separate luminance and chrominance signal path is required to allow manipulating the chrominance prior to re-combining the luminance and chrominance, to assure proper phase of chrominance when the signal subsequently is substituted for a dropout in the color television signal.

Thus as previously mentioned, prior dropout compensator systems have utilized digital filters in bandpass configurations to selectively process separated chrominance and luminance components. These two video components typically are processed in such a way as to synthesize video of one line from the video of one or more previous lines. In the case where the video is synthesized entirely from the previous line of video, it is apparent (in the NTSC broadcast standard) that the chrominance component must be inverted. More particularly, the processing is performed by first separating the luminance and chrominance components, inverting the chrominance component, and re-combining the two components to form the dropout compensated video. Thus, in such prior art compensation systems, the separated luminance and chrominance components are both present somewhere in the filter, the composite signal path and/or in the associated dropout compensator circuitry, and must be re-combined using some type of digital adder. In addition, some type of delay device, i.e., delay equalizing latches, must be used in the luminance path in order to equalize the signal processing times between the luminance and chrominance component signal paths.

Accordingly, it is an object of the invention to provide an all-pass filter of simplified configuration which synthesizes composite video from a previous video line without actually separating the luminance or chrominance components of the composite video signal.

It is another object of the invention to invert a chrominance component signal of a composite video signal being delayed without extracting the chrominance component, by the selective weighting, i.e., gain and/or attenuation values, of the composite signal in the digital filter.

It is still another object to provide a digital finite impulse response, all-pass filter which inverts a selected component of a composite signal without performing a separation process.

A further object is to provide all-pass filtering without use of the usual additional equalizing delay and/or subtractor devices.

Another object is to selectively control component phase inversion within a composite signal path.

Yet another object is to invert a chrominance component by selectively weighting the composite signal passing through selected delay means to provide chrominance inversion without changing the relative phase and amplitude of the luminance component.

Another object is to apply symmetrical gain and/or attenuation values to a composite signal in a selected delay means, whereby the delay of the delay means is twice the effective delay of the filter.

The foregoing and other objects are accomplished while overcoming the disadvantages of the above-mentioned prior art, by the all-pass filter configuration of the invention, which may be used, for example, in a dropout compensator system, in a slow motion operating mode system during video reproduction of a field, etc., wherein the luminance and chrominance components need not be separated in order to synthesize from previous video lines or previous fields reconstituted video with the chrominance component inverted. To this end, an all-pass filter configuration is contemplated which employs a specific modification of selected taps, i.e., weighting functions, i.e., gain and/or attenuation in the filter, to provide the synthesizing process without actually separating the luminance and chrominance components of the composite video signal. Since the all-pass filter itself performs the entire process, the need for the usual adder and delay equalizers along a separate composite signal path no longer exists, thus simplifying the circuitry and the associated synthesizing process.

To this end, the all-pass filter provides selectively controlling the component phase inversion in selected frequency bands within a composite signal, by providing a composite color video signal path within which the chrominance component is inverted. The path includes selected delay means coupled to an input of the signal path defined by the filter for receiving and delaying the composite color video signal. Summing means is coupled to an output of the filter and sums signals received at the inputs of the summing means. A signal weighting means is coupled to the composite signal path between the input of the signal path and the input of the summing means, for providing selected weighting factors to the composite signal at an output of the signal weighting means which is coupled to at least two different locations along the composite signal path between the input of the signal path and the input of the summing means. The weighting factor of the signal weighting means, and their point of coupling to the composite signal path, are selected to effect inversion of the chrominance component within the composite color video signal without changing the phase and amplitude of the luminance component relative to the inverted chrominance component. The terminology "without changing the phase and amplitude of the luminance component relative to the inverted chrominance component" means in the context of the present invention that the relative phase and/or amplitude of the luminance component and chrominance component is not changed to an extent that introduces objectionable disturbance in the resulting composite video signal output by the filter with an inverted chrominance component. For broadcast television applications, it is desirable that any change in this relative phase relationship between the luminance and chrominance components be minimized so that the display of composite video signal obtained from the filter does not contain visually disturbing effects. The relative phase relationship change is minimized in the filter of the present invention by using a delay means that provides a delay substantially equal to two times the effective delay of the filter.

As employed herein, the term weight function or weighting function is intended to correspond to tap selection, and also is intended to represent that some form of amplitude alteration is made to the composite signal by some corresponding selection of either gain and/or attenuation values. In an analog system, the weighting function is commensurate with selection of signal gain and/or signal attenuation of the analog components, as conventionally known. The weighting functions herein preferably are selected to define a symmetrical weighting of the composite signal relative to a center point in the "delay means", i.e., the plurality or series of multiple cascaded delays described hereinafter. Use of symmetrical coefficients of weighting provides a linear phase versus frequency response, which insures that the chrominance inversion is accomplished within the composite video signal path, while preventing an objectional change in the phase and amplitude of the inverted chrominance component relative to the luminance component. The substantially symmetrical coefficients also result in the delay means delay being substantially twice the effective delay of the filter from input to output.

In addition, the term "effective delay of the filter" is intended to mean the delay of the filter from the filter input to the filter output, i.e., the delay imparted to the composite signal fed to the filter input, upon arrival at the filter output. The term "delay means" as employed herein, refers to the actual series of delays which define the delay path of the composite color video signal, wherein the delay means delay herein preferably is twice the effective delay of the filter, given the condition of substantially symmetrical coefficients.

As described in the U.S. Pat. No. 4,251,831, the clock rate employed herein, in either an analog or digital filter system, is coherent with the composite signal and corresponds to the sampling rate, in a digital system.

BRIEF DESCRIPTION OF THE DRAWINGS

FIG. 1 is a block diagram functionally illustrating a prior art chrominance inverting bandpass filter with a separate chrominance component signal path, and a separate composite signal path in which delay equalizing devices must be used.

FIG. 2 is a block diagram functionally illustrating an embodiment of a digital all-pass filter of the invention combination.

FIG. 4A–4B is a schematic diagram of the digital all-pass filter of FIG. 3.

DESCRIPTION OF THE PREFERRED EMBODIMENTS

Figure 3:
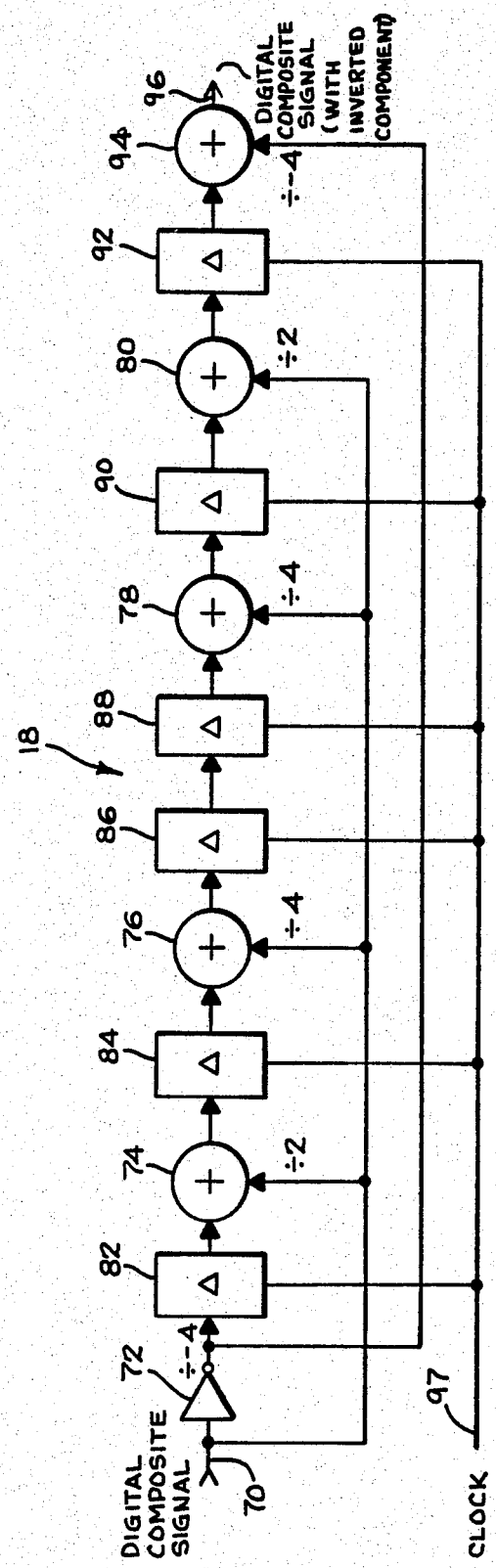
FIG. 3 is a block diagram functionally illustrating an alternate embodiment of the digital all-pass filter of FIG. 2.

FIG. 1 is a functional block diagram, akin to a flow diagram, of a digital chrominance inverting filter 16 of the prior art, which includes a transversal bandpass filter, and a separate composite color video signal path, which employ delay equalizing devices and a subtractor device for signal re-combination. FIG. 2 is a functional block diagram of a digital all-pass filter 18 of the invention combination, wherein the entire chrominance inversion process is performed within an in-line series of delays corresponding to the composite signal path. The structures depicting the filters 16, 18 represent the functions of the elements shown, as well as the corresponding electronic components. Filter 16 is typical of present DOC bandpass filters and an example thereof is described in the U.S. Pat. No. 4,251,831 of previous mention. Although it is immediately obvious that the all-pass filter 18 of the invention is much simpler in configuration than the prior transversal filter 16, the former filter provides an output response identical to the latter. Unlike the filter 16, the all-pass filter 18 of FIG. 2 effectively provides inversion of the chrominance component, given a composite video signal as the input, without actually separating the chrominance component from the composite video signal, as is a must in the successful operation of the prior art filter 16.

As generally known in the filter art, it has been proven that if two digital filters are supplied with an impulse function at their inputs, and both have the same output response to that input signal, then the two filters are functionally identical. Therefore, to illustrate the advantages of the invention, the filters of FIGS. 1 and 2 are compared herein to show they are identical in output response, given the same input as a function of time, and therefore are identical even though the all-pass filter 18 is much simpler. To this end, various points along the two circuits are identified, and impulse function is supplied at the input, and is followed step-by-step through both circuits to show the values of the signal at each point in the circuits. By following the two filter circuits point-by-point to their final outputs, it can be shown that the input response functions of the filters 16 and 18 are identical, given the same input.

The chrominance inverting filter 16 of FIG. 1 includes the comination of a transversal bandpass filter 20, coupled to means 24 for multiplying the component signal by two and re-combining it with the delayed input signal. The filter 20 and means 24 define a first path through which the chrominance component is processed. Delay equalizing means 22 defines a second path through which the composite signal is processed, and subsequently added back to the inverted chrominance in the adder of means 24. The prior art filter 16 included an input 26 and an output 28. The all-pass filter 18 of FIG. 2 includes similar input 26' and an output 28'. A clock signal used to clock the various components in both filter circuits, is supplied via respective clock lines 30, 30' in filters 16, 18 and may comprise, for example, a multiple of the reference chrominance subcarrier (for example, 4Fsc) timing signal conventionally used in color television systems.

The signal supplied to inputs 26, 26', in the example used to make a comparison of the two circuits, is an impulse function employed herein to illustrate the operation of the filters, and conventionally comprises an infinite series of digital "0" samples, followed at one point in time by a digital "1" sample, which is followed in turn by another infinite series of digital "0" samples.

With reference first to the prior art filter 16 of FIG. 1, the impulse function on input 26 is supplied to a weight function of $-\frac{1}{4}$ indicated herein at 32, along a first signal path, and to a weight function of $\frac{1}{2}$ indicated at 34, along a second signal path. The "output" of weight function 32 comprises point 1 in the circuit and is coupled to the input of a first delay 36. The delays each provide a time delay of one clock sample. The delay 36 thence is coupled to a second delay 38, whose output comprises point 2 in the circuit. The output of delay 38 is supplied to one input of a first adder 40, which is configured at its second input to define the weight function 34, wherein the second input corresponds to point 3 of the filter. The output of the adder 40 is the sum of the values at points 2 and 3 and, in turn, is point 4 in the filter circuit. Adder 40 is coupled to a third delay 42, whose output is supplied to a fourth delay 44. The output of delay 44 comprises point 5 in the circuit and is supplied to one input of a second adder 46, whose second input is configured to define the weight function 32.

The output of the adder 46 is the sum of the values at points 5 and 1, and constitutes a component signal of a composite signal input; that is, is the chrominance component signal at point 6 of the circuit if a composite color video signal were being processed by the filter. The component is applied to a times-two multiplier 48, which multiplies the component by two. The output of multiplier 48 is supplied as point 7 to the negative input of an adder 50, which operates as a subtractor device. The output of the adder 50 corresponds to the subtraction of the value at point 7 from the value at a point 8, and is the output 28 of the filter 16 of FIG. 1. With the impulse function as an input, the output is an impulse response function.

The impulse function on input 26 is also supplied to a delay equalizing delay 52 on a third signal path, and thence is coupled to another delay 54. As is well known, the two delays of path three are equal to the delay caused by the delays in the first path of filter 20. The output of delay 54 comprises the point 8 in the circuit and is supplied to the positive input of the adder 50.

Referring to FIG. 2, the identical impulse function is provided on input 26' to a weight function of $\frac{1}{2}$, indicated herein by numeral 56. The "output" of the weight function 56 corresponds to point 1' which, in turn corresponds to point 1 of FIG. 1. Point 1' defines the input to a first delay 58 of a delay means. The output of delay 58 is supplied to a delay 60, and thence to a third delay 62. The latter supplies an output to a fourth delay 64, whose output comprises point 2' corresponding to the point 5 of filter 16 of FIG. 1. The output of delay 64 is coupled to one input of an adder 66, whose output is the filter 18 output 28' corresponding to the output 28 of FIG. 1. The input signal, weighted by $\frac{1}{2}$ via weight function 56, is also coupled directly to the second input of the adder 66, and corresponds to point 1'. The delays 58-64 define the delay means of previous mention, and are clocked by the clock on line 30'. Thus the impulse function is clocked through the delays, with each providing a delay of one clock sample, such as previously described in FIG. 1.

In the embodiment of the present invention illustrated in FIG. 2, a single weighting means 56 is employed to provide at its output a weighted representation of its input, that is coupled to two different locations along the composite signal path between the input 26' of the filter 18 and the input of the adder or summing means 40. One of the two locations is the input to the first delay 58 of the cascaded delay means 58-64 and the other of the two locations is the input to the adder 66. It should be appreciated, however, the embodiment of FIG. 2 could be modified so that the weighting means 56 includes two identical signal weighting devices. In such modified embodiment, one signal weighting device with a weight function of $\frac{1}{2}$ is coupled in the first composite signal path between the junction proximate the input 26' of the filter 18 and the input of the first delay 58 of the cascaded delay means 58-64. The second signal weighting device, also with a weight function of $\frac{1}{2}$, is coupled in the second composite signal path between the junction and the input of the adder 66. In the embodiment illustrated in FIG. 2 and the modified embodiment described above, the weighting means 56 has one of its outputs coupled directly to the input of the adder 66 and the second of its output coupled to the input of the adder through intervening delays.

By way of comparing the filters of FIGS. 1 and 2, reference is made to TABLE 1 herein, which shows the values of the impulse response as it is clocked step-by-step through each filter's components. Thus, for example, the time in clock periods, is depicted horizontally across TABLE 1, while the value of the input signal at each point, starting at the inputs and ending at the outputs of the two filters, is depicted vertically. Thus, the prior art filter 16 of FIG. 1 includes values at the input 26, at points 1 through 8, and at the output 28 thereof. Similarly, the invention filter 18 of FIG. 2 includes values at the input 26', at points 1', 2', and at the output 28'.

TABLE 1

|  | Time (in clock periods) | | | | | | | | | | |
|---|---|---|---|---|---|---|---|---|---|---|---|
|  | 0 | 1 | 2 | 3 | 4 | 5 | 6 | 7 | 8 | 9 | |
| Input | 0 | 0 | 0 | 0 | 1 | 0 | 0 | 0 | 0 | 0 | FIG. 1 |
| 1 | 0 | 0 | 0 | 0 | $-\frac{1}{4}$ | 0 | 0 | 0 | 0 | 0 | |
| 2 | 0 | 0 | 0 | 0 | 0 | 0 | $-\frac{1}{4}$ | 0 | 0 | 0 | |
| 3 | 0 | 0 | 0 | 0 | $\frac{1}{2}$ | 0 | 0 | 0 | 0 | 0 | |
| 4 | 0 | 0 | 0 | 0 | $\frac{1}{2}$ | 0 | $-\frac{1}{4}$ | 0 | 0 | 0 | |
| 5 | 0 | 0 | 0 | 0 | 0 | 0 | $\frac{1}{2}$ | 0 | $-\frac{1}{4}$ | 0 | |
| 6 | 0 | 0 | 0 | 0 | $-\frac{1}{4}$ | 0 | $\frac{1}{2}$ | 0 | $-\frac{1}{4}$ | 0 | |
| 7 | 0 | 0 | 0 | 0 | $-\frac{1}{2}$ | 0 | 1 | 0 | $-\frac{1}{2}$ | 0 | |
| 8 | 0 | 0 | 0 | 0 | 0 | 0 | 1 | 0 | 0 | 0 | |
| Output | 0 | 0 | 0 | 0 | $\frac{1}{2}$ | 0 | 0 | 0 | $\frac{1}{2}$ | 0 | |
| 1' | 0 | 0 | 0 | 0 | $\frac{1}{2}$ | 0 | 0 | 0 | 0 | 0 | FIG. 2 |
| 2' | 0 | 0 | 0 | 0 | 0 | 0 | 0 | 0 | $\frac{1}{2}$ | 0 | |
| Output' | 0 | 0 | 0 | 0 | $\frac{1}{2}$ | 0 | 0 | 0 | $\frac{1}{2}$ | 0 | |

Accordingly, by way of example only, (at least) four "0"s (zeros) are followed by a "1" (one) which is followed by five consecutive zeros to define the impulse function input. The clock, which may be a reference timing clock, such as 4Fsc commonly used in television systems, is applied at lines 30, 30' of the circuits and is shown across the top of TABLE 1 as time in successive clock periods.

Considering first the prior art filter of FIG. 1, the first four digital zeros of the input 26, on the zero, first, second and third clocks, generate all digital zeros at the points 1 through 8. However, when a digital one is supplied at input 26 as at the fourth clock, point 1 has a value $-\frac{1}{4}$, point 2 a has a zero, points 3 and 4 have a $\frac{1}{2}$, point 5 has a zero, point 6 has a $-\frac{1}{4}$, point 7 has a $-\frac{1}{2}$, point 8 has a zero, and the output has a $\frac{1}{2}$, as a result of adder 50 subtracting $-\frac{1}{2}$ at point 7 from the zero at point 8.

At the fifth clock, the input returns to the series of zeros, and all points 1 through 8 and the output, have zeros. At the sixth clock, with the input at zero, points 1 and 3 have zeros, points 2 and 4 have $-\frac{1}{4}$, points 5 and 6 have $+\frac{1}{2}$, and points 7 and 8 have ones, whereby the adder 50 subtracts the sum of a $+1$ and $+1$ to provide a zero on the output 28. On the seventh clock the input is zero, the points 1 through 8 and the output, are all zeros. At the eighth clock the input is still zero, points 1 through 4 are zero, points 5 and 6 have $-\frac{1}{4}$, point 7 has $-\frac{1}{2}$ and point 8 has a zero. Thus adder 50 provides an output of $\frac{1}{2}$ as a result of subtracting a $-\frac{1}{2}$ from zero. At the ninth clock all points again are at zero.

It may be seen that delays 36, 38 provide two clock period delays, whereby the value that appears at point 1 on the fourth clock, is seen at point 2 two clock periods later at the sixth clock. Correspondingly, the results of the impulse function may be followed through the delays, etc., via the various points in the circuit of FIG. 1 in relation to the sequence of clocks supplied on line 30. Thus, for example, the value at point 4 is the sum of the values at points 2 and 3 at the same clock time. Likewise, the value at point 6 is the sum of the values at point 5 and point 1 at the same clock time.

Referring now to the invention all-pass filter of FIG. 2, and employing the same impulse function at input 26', the same procedure may be followed at the indicated points in the circuit, i.e., points 1', 2' and the output 28'. It is readily seen that the filter 18 is relatively simple when compared to the prior art filter 16 of FIG. 1. Thus, with the digital one input at the fourth clock, point 1' has a $\frac{1}{2}$ and point 2' and a zero, whereby the output' has a $\frac{1}{2}$ supplied by the adder 66 when summing $\frac{1}{2}$ and a 0. At clock times 5, 6 and 7, the points and the output' have zeros. At the eighth clock, the digital one which was multiplied by $\frac{1}{2}$ via weight function 56 has been delayed four clock periods by delays 58-64, and is added to a zero by adder 66. Thus the output 28' at the eighth clock, equals the sum of points 1' and 2', i.e., equals $\frac{1}{2}$.

Accordingly, by comparing the output and output' signals of the filters 16 and 18 respectively, it may be seen that the two circuits provide identical impulse response functions.

Figure 4A:
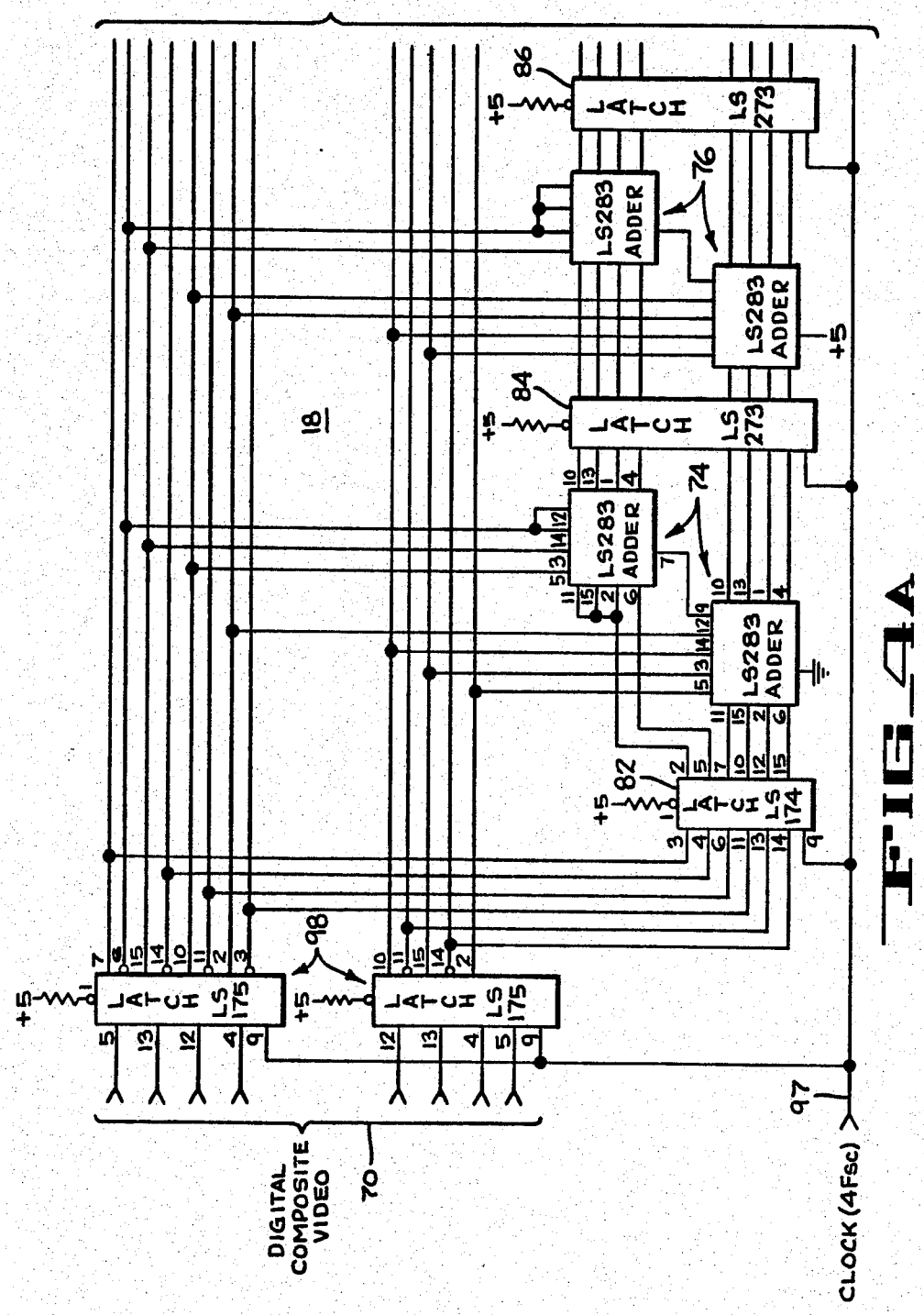

Implementation of the all-pass filter 18 of FIG. 2 is generally straightforward; the $\frac{1}{2}$ weight function 56 is provided by shifting the bits down by one input; the delays 58-64 are latches, and particularly registers such as, for example, the LS273 manufactured by Texas Instruments, Inc.; and the adder 66 may be made up of 4-bit binary adders such as, for example, the LS283 manufactured by Texas Instruments, Inc., as further described in FIG. 4A-4B. The delays 58-64 may be implemented in digital filters by any digital means for storing data, and in analog filters by analog delay lines, etc.

FIG. 3 depicts an alternate embodiment of the invention all-pass filter with added components and thus added sophistication. The embodiment of FIG. 3 has the added advantage of providing a filter response that minimizes the amount of inverted luminance and of non-inverted chrominance in the composite video signal provided at the output of the filter. This minimization is achieved because only a band of frequencies corresponding to the range of frequency deviation of the chrominance subcarrier is inverted by the filter. More particularly, a digital composite signal supplied to an input 70 is fed to an inverter 72, and also as one input to each of a series of adders 74, 76, 78 and 80, which together with a last stage adder 94 form a distributed summing means corresponding to the summing means 66 of the embodiment of FIG. 2. As can be seen in FIG. 3, the series of adders 74, 76, 78, 80 and 94 are distributed along the composite signal path through the series of delays defining the delay means corresponding to the delay means of FIG. 2. The inverted composite signal is fed to a first delay 82, and thence to a second input of the adder 74, whose output is fed to a second delay 84. Delay 84 is coupled to a second input of the adder 76. The output of the latter is supplied to a third delay 86 and thence to a fourth delay 88, whose output is fed to a second input of the adder 78. The output of adder 78 is supplied to a fifth delay 90 and thence to a second input of the adder 80. The latter provides an input to a sixth delay 92, which is coupled to a first input of an adder 94. The latter supplies an output 96 with a digital composite signal having an inverted component. The output of the inverter 72 is also coupled to a second input of the adder 94. The delays 82-92 are clocked via a clock signal supplied on a clock line 97, and may be a conventional reference clock as previously mentioned. As in FIG. 2, the delays may be implemented by registers, latches, memories, etc., whereby the registers and adders may be the same components as previously mentioned.

As may be seen from FIGS. 2 and 3, the all-pass filter does not actually separate the component signal from the composite signal at any point in the circuit, and accordingly requires fewer electronic components to implement than the transveral bandpass filters of the prior art such as shown, for example, in the U.S. Pat. No. 4,251,831 of previous mention. Thus, given a composite color video signal as an input, the simplified filter accomplishes the entire processes of chrominance separation, inversion and subsequent re-combination to provide the composite signal with inverted chrominance and no change of the luminance phase and amplitude, without actually separating the component signals. It follows, the processes are achieved without the usual associated delay equalizing register and the adder devices of the prior art filters. To this end, the digital composite signal fed to the delay 82 and adders 74, 76, 78, 80 and 94 which perform selected weighting of the composite video signal as well as summing of delayed and undelayed composite video signal portions. The adders, therefore define a set of distributed signal weighting devices that forms a weighting means corresponding to the weighting means 56 of the embodiment of FIG. 2. The weighting devices or adders selectively weight the undelayed composite video signal by the weight functions $-\frac{1}{4}$ and $\frac{1}{2}, \frac{1}{4}, \frac{1}{4}, \frac{1}{2}$ and $-\frac{1}{4}$, respectively.

Referring to FIG. 4A-4B, there is depicted an implementation of the block diagram of FIG. 3, wherein the configuration of delays (registers), adders and weight functions are depicted in schematic, by way of example only. Like components in the figures are similarly numbered. Thus, an input terminal 70 is herein supplied with a digital composite color video signal in the form of binary 8-bit data samples, and thence to a latch 98. The latter herein is exemplified as a quad D-type flip-flop which converts the data from the binary number system to a 2's complement number system, to provide the 50 minus numbers required by the filter. Use of the 2's complement system allows the circuit to do mathematical overloads within the filter without any complications.

Thus the latch 82 (which is exemplified herein as a hex D-type flip-flop) is coupled to those output pins on latch 98 which provide the latter with video data in inverted form and with the weight functions of $-\frac{1}{4}$ depicted in FIG. 3. Note that the "delay" elements of FIGS. 1-3 and thus the components 82-92, all are herein termed "latches" for ease of description. The latch 82 is coupled to the adder 74 with the bits shifted down by one to provide the $\frac{1}{4}$ weight function depicted in FIG. 3. Likewise, the adders 76-80 and 94 are selectively coupled to specific output pins of the latch 98 to provide the weight functions and signs previously depicted in FIG. 3. Note the filter weight functions have a symmetrical relationship about the center of the filter configuration, i.e., the point between latches 86 and 88, to provide symmetrical weighting of the composite signal. The resulting symmetrical coefficient provides a preferred linear response of phase shift versus frequency for the all-pass filter of the invention which, in turn, assures that the inverted chrominance is accomplished while preventing an ojectionable change in the luminance phase and amplitude relative to the inverted chrominance.

The output of the adder 94 in FIG. 4B is coupled to a further latch 100, which re-clocks the data samples before supplying them to the output terminal 96 as the digital composite color video signal with chrominance inverted and no change to the relative phase and amplitude of the luminance. The most significant bit of the sample (pin 19) is inverted via inverter 102 to convert the data from the 2's complement number system back to the binary number system.

The invention all-pass filter contemplates further filter configurations wherein the clock rate of 4Fsc is replaced by another selected chrominance subcarrier frequency. To this end, the filter structure taps, or weights, delays and adders are selected to conform to the new clock frequency.

What is claimed is:

1. A filter for receiving a composite color video signal including luminance and chrominance components and inverting the chrominance component relative to the luminance component without separating the chrominance and luminance components, said filter defining a signal path for the composite color video signal extending between an input for receiving the composite color video signal and an output, and defining a selected effective delay for the composite color video signal between the input and output, comprising:
   delay means coupled to the input of the signal path for receiving and delaying the composite color video signal;
   summing means having an input for receiving and summing signals and providing a summed output at the output of the signal path;
   signal weighting means with a selected weighting factor coupled to the signal path between the input thereof and the input to the summing means for receiving the composite color video signal and providing a respective weighted value representation of the received composite color video signal at an output of the signal weighting means; and
   the output of the signal weighting means coupled to at least two different locations along the signal path, with the selected weighting factor of the weighting means and the location along the signal path selected to effect at the output of the signal path an inversion of the chrominance component without objectionably changing the phase and amplitude of the luminance component relative to the inverted chrominance components.

2. The filter of claim 1 wherein the output of the signal weighting means is coupled to the input of the delay means and to the input of the summing means to apply selected weighting factors thereto.

3. The filter of claim 2 including:
   clock means having a selected clock rate for clocking the composite signal through the delay means at a rate synchronous to the selected clock rate.

4. The filter of claim 3 wherein the delay means time delay is substantially two times the effective time delay of the filter.

5. The filter of claim 3 wherein the delay means include:
 a plurality of time delays operatively coupled in in-line relation to define the signal path for applying successive delay times of a clock sample each to the composite signal as it is clocked through the time delays in response to the means for clocking; and
 said selected clock rate is coherent with the composite signal and corresponding to the signal sample rate.

6. The filter of claim 5 wherein:
 the plurality of time delays include at least four time delays through which the composite signal is clocked in response to the clock means;
 the signal weighting means applies the selected weighting factor to the composite signal at least two locations along the signal path; and
 the summing means is coupled to sum the delayed composite signal from the output of the time delays with the weighted undelayed composite signal from the output of the signal weighting means.

7. The filter of claim 5 wherein the composite color video signal is provided in the form of consecutive digital representations, and wherein:
 the time delays comprise digital means for receiving and storing the digital representations at the selected clock rate;
 the summing means comprise digital adder means for receiving and summing the received digital representations; and
 the weighted value representation of the selected weighting factor is provided by selectively shifting the digital representations of the composite color video signal received at the locations coupled to the signal path.

8. The filter of claim 5 wherein the composite color video signal is provided as an analog signal, and wherein:
 the delay means comprise an in-line plurality of analog delay lines of selected time period delays;
 the summing means comprise an analog adder means for receiving and summing the received analog signal; and
 the weighted value representation of the selected weighting factor comprises corresponding gain or attenuation at the given location along the signal path.

9. The filter of claim 1 wherein the signal weighting means include:
 at least one signal weighting means having a weighting factor for receiving the composite color video signal and providing at least one weighted value representation thereof at the output of the at least one signal weighting means; and
 said weighted value representation is applied to the input of the delay means at one of the two different locations, and to the input of the summing means at the second location.

10. The filter of claim 9 wherein:
 the weighting factors have symmetrically weighted values relative to a central point of the delay means;
 the delay means time delay is substantially two times the effective time delay of the filter; and
 wherein the inversion of the chrominance component at the output of the composite signal path is effected without objectionable change to the phase and amplitude of the luminance component relative thereto as a result of the selection of the weighted values.

11. The filter of claim 9 including:
 clock means having a selected clock rate coupled to the delay means for clocking the composite signal therethrough at a rate synchronous with the selected clock rate.

12. A filter for receiving a composite color video signal including luminance and chrominance components and inverting the chrominance component relative to the luminance component without separating the chrominance and luminance components, said filter defining a signal path for the composite color televison signal extending between an input for receiving the composite color video signal and an output, and defining a selected effective delay for the composite color video signal between the input and output of the filter, comprising:
 delay means coupled to the input of the signal path for receiving and delaying the composite color video signal;
 summing means having an input for receiving and summing signals and providing a summed output at the output of the signal path;
 a first signal weighting means with a first selected weighting factor coupled to the signal path between its input and the input to the summing means for receiving the composite color video signal and providing a first weighted value representation of the received composite color video signal at an output of the first signal weighting means; and
 at least a second signal weighting means with a second selected weighting factor coupled to the signal path between its input and the input to the summing means for receiving the composite color video signal and providing a second weighted value representation of the received composite color video signal at an output of the second signal weighting means; and
 the outputs of said first and at least second signal weighting means coupled to the input of said summing means, and the first and second weighting factors of the first and at least second signal weighting means and the location along the signal path at which each of the first and at least second signal weighting means are coupled for receiving the composite color video signal, are selected to effect at the output of the signal path an inversion of the chrominance component without objectionably changing the phase and amplitude of the luminance component relative to the inverted chrominance component.

13. The filter of claim 12 wherein the first and at least second signal weighting means provide weighted value representations which are substantially symmetrically distributed relative to the delay means.

14. The filter of claim 13 wherein the delay means time delay is substantially two times the effective time delay of the filter.

15. The filter of claim 12 wherein the delay means include:
 a plurality of time delays selectively coupled in in-line relation to define the signal path along which the outputs of first and at least second signal weighting means are coupled;
 the time delays having an input coupled to the input of the signal path, and having an output; and said summing means being coupled to the output of the time delays.

16. The filter of claim 15 further including:
clock means having a selected clock rate coherent with the composite signal and commensurate with the sample frequency for clocking the composite signal through the time delays at a rate synchronous with the selected clock rate.

17. The filter of claim 12 wherein the summing means include:
a distributed summing means selectively distributed along the composite signal path through the delays means and corresponding to the in-line relation thereof, the distributed summing means providing further locations for receiving the weighted composite signal along the signal path between the input of the filter and the input to the summing means.

18. The filter of claim 17 including:
a third signal weighting means with a third selected weighting factor coupled to one of the further locations along the signal path and providing a third weighted value representation of the received composite color video signal at the output of the third signal weighting means; and
a fourth signal weighting means with a fourth selected weighting factor coupled to another of the further locations along the signal path and providing a fourth weighted value representation of the received composite color video signal at the output of the fourth signal weighting means.

19. The filter of claim 18 including:
a fifth signal weighting means with a fifth selected weighting factor coupled to another of the further locations along the signal path and providing a fifth weighted value representation of the received composite color video signal at the output of the fifth signal weighting means; and
a sixth signal weighting means with a sixth selected weighting factor coupled to another of the further locations along the signal path and providing a sixth weighted value representation of the received composite color video signal at the output of the sixth signal weighting means.

20. The filter of claim 17 wherein the delay means and the distributed summing means include:
a first odd number of time delays;
adder means coupling the first odd number of time delays together;
a second odd number of time delays;
adder means coupling the second odd number of time delays together;
wherein the first and second odd number of delays are coupled to define overall the delay means; and
said adder means being coupled to respective outputs of the weighting signal means to apply corresponding weighted value representations to the composite signal at the corresponding locations along the signal path.

21. A filter for receiving a composite color video signal including luminance and chrominance components and inverting the chrominance component relative to the luminance component without separating the chrominance and luminance components, said filter defining a signal path for the composite color televison signal extending between an input for receiving the composite color video signal and an output, and defining a selected effective delay for the composite color video signal between the input and output of the filter, comprising:
multiple delay means having an input and an output and coupled at its input to the input of the signal path for receiving and delaying the composite color video signal;
summing means having inputs for receiving the delayed signal from the delay means and the undelayed composite color video signal from the input of the signal path and for providing a summed output at the output of the signal path;
signal weighting means with a selected weighting factor coupled to the signal path at its input and at the undelayed signal input to the summing means, for receiving the respective composite signals and applying thereto respective weighed value representations, the weighting factors being selected to effect at the output of the signal path the inversion of the chrominance component without objectionably changing the phase and amplitude of the luminance component relative thereto.

22. The filter of claim 21 including:
clock means having a selected clock rate for clocking the composite color video signal through the multiple delay means at a rate synchronous with the clock rate.

23. The filter of claim 22 wherein the multiple delay means include:
a plurality of in-line register means coupled at a first of the register means to the input of the signal path and at the output of a last of the register means to the input of the summing means, said register means being clocked at the selected clock rate.

24. The filter of claim 23 wherein the signal weighting means include:
a plurality of signal weighting means having a like plurality of selected weighting factors for receiving the composite color video signal and providing respective weighted value representations thereof at respective outputs of the plurality of signal weighting means.

25. The filter of claim 24 wherein the summing means include:
adder means distributed along the plurality of in-line register means for receiving the composite signal with respective weighted value representations from the respective output of the signal weighting means.

* * * * *

UNITED STATES PATENT AND TRADEMARK OFFICE
CERTIFICATE OF CORRECTION

PATENT NO. : 4,528,598

DATED : July 9, 1985

INVENTOR(S) : David E. Trytko, Steven D. Wagner

It is certified that error appears in the above-identified patent and that said Letters Patent is hereby corrected as shown below:

```
column   5, line 33, change "comination" to --combination--.
column   7, line 34, under column 7 insert --0--.
column   9, line 63, change "¼" to --½--.
```

Signed and Sealed this

Fourteenth Day of January 1986

[SEAL]

Attest:

Attesting Officer

DONALD J. QUIGG

Commissioner of Patents and Trademarks